US012772130B2

(12) United States Patent
Li et al.

(10) Patent No.: US 12,772,130 B2
(45) Date of Patent: Oct. 20, 2026

(54) SYSTEMS AND METHODS FOR ENABLING INTER-RAT CONDITIONAL HANDOVERS

(71) Applicant: Verizon Patent and Licensing Inc., Basking Ridge, NJ (US)

(72) Inventors: Hongkun Li, Basking Ridge, NJ (US); Jun Yuan, Cranbury, NJ (US); Weimin Shi, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 279 days.

(21) Appl. No.: 18/605,525

(22) Filed: Mar. 14, 2024

(65) Prior Publication Data

US 2025/0294422 A1 Sep. 18, 2025

(51) Int. Cl.

*H04W 36/14* (2009.01)
*H04W 36/36* (2009.01)

(52) U.S. Cl.

CPC ....... *H04W 36/144* (2023.05); *H04W 36/362* (2023.05)

(58) Field of Classification Search

CPC ......... H04W 36/0061; H04W 36/0058; H04W 76/19; H04W 76/20; H04W 36/0083; H04W 36/00833; H04W 24/02

See application file for complete search history.

(56) References Cited

U.S. PATENT DOCUMENTS

2020/0351694 A1* 11/2020 Chen .................. H04W 36/362
2024/0098478 A1* 3/2024 Kumar .................. H04W 4/021

* cited by examiner

*Primary Examiner* — Oleg Asanbayev

(57) ABSTRACT

A device may include a processor configured to receive an indication that a user equipment (UE) device is enabled for performing conditional handovers between different Radio Access Technology (RAT) types. The processor may be further configured to select to prepare a conditional handover for the UE device; select potential target nodes for the conditional handover for the UE device, which include at least one potential target node of a different RAT type than a RAT type currently being used by the UE device to communicate with a base station; generate one or more inter-RAT conditional event criteria for performing an inter-RAT conditional handover by the UE device based on the received indication; and provide conditional handover information to the UE device, which includes information identifying the selected plurality of potential target nodes and information identifying the generated one or more inter-RAT conditional event criteria.

20 Claims, 7 Drawing Sheets

SYSTEMS AND METHODS FOR ENABLING INTER-RAT CONDITIONAL HANDOVERS

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. For example, the provider may need to facilitate communication using different wireless communication technologies. Managing communication using different wireless communication technologies may pose various difficulties.

DETAILED DESCRIPTION OF PREFERRED EMBODIMENTS

Figure 1:
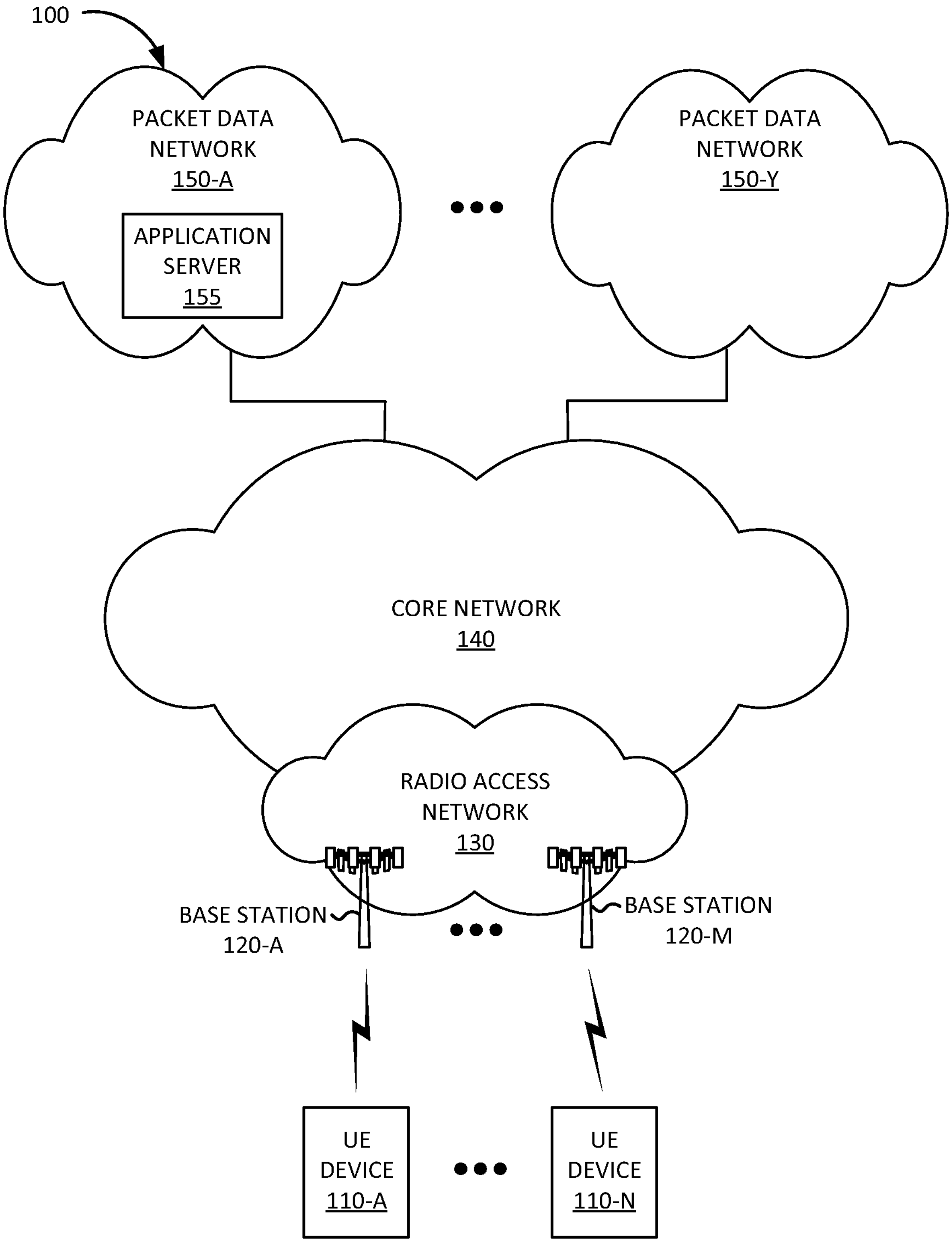
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable wireless communication devices (e.g., smart phones, etc.), referred to as user equipment (UE) devices, to connect to networks and obtain services via the provider's core network, such as a Fourth Generation (4G) core network, a Fifth Generation (5G) core network, and/or other next generation networks.

A 5G RAN may employ high frequency bands and/or a large number of antennas. 5G air interface technology, referred to as 5G New Radio (NR) radio access technology (RAT), may provide significant improvements in bandwidth and/or latency over other wireless network technologies. Furthermore, coverage and signal quality may be improved using multiple-input and multiple-output (MIMO) adaptive antenna arrays. Additionally, UE devices may also include multiple antennas to improve spectral efficiency.

The 5G NR air interface may provide high data throughput in comparison to the data throughput of a Fourth Generation (4G) Long Term Evolution (LTE) air interface. However, because of wave frequencies, the 5G NR air interface may be susceptible to intermittent signal quality degradation due to multipath wave propagation and fading. Such variations in signal quality may be particularly important in areas with a low density of 5G coverage.

5G NR may initially be deployed to provide islands of coverage relative to existing legacy cellular wireless coverage. Thus, areas with 5G NR coverage may include 4G LTE coverage. 5G coverage may be provided via 5G base stations, referred to as gNodeBs, and 4G LTE coverage may be provided via 4G base stations, referred to as eNodeBs. A UE device may perform an Inter-RAT handover between different RAT types, such as a handover from a 5G RAT type to a 4G RAT type (e.g., from a gNodeB to an eNodeB, etc.) or a handover from a 4G RAT type to a 5G RAT type (e.g., from an eNodeB to a gNodeB, etc.). The UE device may perform an Inter-RAT handover as a result of moving from a first area of coverage provided by a first base station of a first RAT type to a second area of coverage provided by a second base station of a second RAT type. Alternatively, the UE device may perform a fallback Inter-RAT handover from a 5G RAT type to a 4G RAT type (e.g., due to signal degradation from multipath fading, etc.) on the same base station, or a fallback reversal Inter-RAT handover if 5G signal quality improves.

Inter-RAT handovers may take an undesirably long time. For example, an Inter-RAT handover, from a source base station to a target base station, may take up to 800 milliseconds (ms) or longer. Such a long handover may cause an interruption and/or delay in data transfer, resulting in a negative user experience. A conditional handover may reduce mobility-related failures and/or interruption time for existing user data flow sessions. During a conditional handover, a source base station to which a UE device is attached, may identify and prepare a set of potential target base stations in advance of a handover. The handover command may then be sent by the source base station to the UE device along with a set of handover criteria. The UE device may carry out the handover command when a handover criterion is satisfied for a target base station, from the set of potential target base stations, and may then connect to the target base station. Thus, a conditional handover may be performed faster, thereby conserving network resource and improving user experience.

Implementations described herein relate to systems and methods for enabling and performing inter-RAT conditional handovers. A UE device may be enabled to perform conditional handover between different RAT types. For example, the UE device may be enabled to perform a conditional handover from a gNodeB to an eNodeB and/or from an eNodeB to a gNodeB. In some implementations, a base station may instruct the UE device to enable conditional handovers between different RAT types.

A base station may be configured to receive an indication that a UE device is enabled for performing conditional handovers between different RAT types. The indication may be received, for example, in a UE capability information message from the UE device. The base station may be further configured to select to prepare a conditional handover for the UE device; select a set of potential target nodes (e.g., base stations) for the conditional handover for the UE device, including at least one potential target node of a different RAT type than a RAT type currently being used by the UE device to communicate with a base station; generate one or more inter-RAT conditional event criteria for performing an inter-RAT conditional handover by the UE device based on the received indication; and providing conditional handover information to the UE device with information identifying the selected potential target nodes and information identifying the generated one or more inter-RAT conditional event criteria. The UE device may then perform a conditional handover with respect to a target node from the set of potential target nodes if an inter-RAT conditional event criterion is satisfied.

Selecting to prepare the conditional handover for the UE device may include sending conditional handover requests to the potential target nodes. Providing the conditional handover information to the UE device may include sending a Radio Resource Control (RRC) Reconfiguration message to the UE device.

Generating the one or more inter-RAT conditional event criteria for performing the conditional handover by the UE device may include selecting a signal strength and/or quality parameter; selecting a signal to measure; and selecting a threshold value for the selected signal strength or quality parameter for the selected signal as a condition for activating the inter-RAT conditional handover. The selected signal strength and/or quality parameter may include a Reference Signal Received Power (RSRP), a Reference Signal Received Quality (RSRQ), a Received Signal Strength Indicator (RSSI), a Signal to Interference and Noise Ratio (SINR), Channel Quality Indicator (CQI), Block Error Rate (BLER), and/or another parameter indicative of signal strength and/or quality. In some implementations, the selected signal strength and/or quality parameter may additionally include a MIMO rank indicator. The selected signal to measure may include a Synchronization Signal (e.g., a Primary Synchronization Signal (PSS), a Secondary Synchronization Signal (SSS), etc.), a Channel State Information (CSI) Reference Signal (CSI-RS), and/or another type of signal broadcast by the base station.

Additionally, or alternatively, generating the one or more inter-RAT conditional event criteria for performing the conditional handover by the UE device may include determining a value for a key performance indicator (KPI) parameter associated with a potential target node of the different RAT type and selecting a threshold value for a signal strength and/or quality parameter for a synchronization or reference signal as a condition for activating the inter-RAT conditional handover based on the determined value for the KPI parameter.

Additionally, or alternatively, generating the one or more inter-RAT conditional event criteria for performing the conditional handover by the UE device may include selecting a range of values for a parameter associated with the UE device; and associating a threshold value for a signal strength or quality parameter for a synchronization or reference signal as a condition for activating the inter-RAT conditional handover with the selected range of values for the parameter associated with the UE device. The parameter associated with the UE device may include, for example, a speed associated with the UE device, an elevation associated with the UE device, a handover time associated with the UE device, a handover failure rate associated with the UE device, a latency associated with the UE device, a packet error rate associated with the UE device, and/or another type of parameter.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), a RAN 130 that includes base stations 120-A to 120-M (referred to herein collectively as "base stations 120" and individually as "base station 120"), a core network 140, and packet data networks (PDNs) 150-A to 150-Y (referred to herein collectively as "PDNs 150" and individually as "PDN 150").

UE device 110 may include any mobile device with cellular wireless communication functionality. UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, a portable gaming system, and/or another type of portable computer; a WiFi access point (AP); a Fixed Wireless Access (FWA) device; and/or any other type of mobile computer device with cellular wireless communication capabilities. In some implementations, UE device 110 may communicate using machine-to-machine (M2M) communication, such as Machine Type Communication (MTC), and/or another type of M2M communication for IoT applications.

Base station 120 may include a 5G New Radio (NR) base station (e.g., a gNodeB) and/or a 4G Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface.

RAN 130 may include base stations 120 and be managed by a provider of wireless communication services. RAN 130 may enable UE devices 110 to connect to core network 140 via base stations 120 using cellular wireless signals. For example, RAN 130 may include one or more central units (CUs), distributed units (DUs), and/or Radio Units (RUs) (not shown in FIG. 1) that enable and manage connections from RUs to core network 140. RAN 130 may include features associated with an LTE Advanced (LTE-A) network and/or a 5G network or other advanced network, such as management of 5G NR base stations; carrier aggregation; advanced or massive MIMO configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Core network 140 may be managed by the provider of cellular wireless communication services and may manage communication sessions of subscribers connecting to core network 140 via RAN 130. For example, core network 140 may establish an Internet Protocol (IP) connection between UE devices 110 and PDN 150. In some implementations, core network 140 may include a 5G core network. The components of core network 140 may be implemented as dedicated hardware components and/or as Virtual Network Functions (VNFs) implemented on top of a common shared physical infrastructure using Software Defined Networking (SDN). For example, an SDN controller may implement one or more of the components of core network 140 using an adapter implementing a VNF virtual machine, a Cloud-Native Network Function (CNF) container, an event driven serverless architecture, and/or another type of SDN architecture. The common shared physical infrastructure may be implemented using one or more devices 200 described below with reference to FIG. 2 in a cloud computing center associated with core network 140.

PDNs 150-A to 150-Y may each be associated with a Data Network Name (DNN) in 5G, and/or an Access Point Name (APN) in 4G. UE device 110 may request a connection to PDN 150 using a DNN or an APN. For example, UE device 110 request a connection to an application server 155 (shown in PDN 150-A for illustrative purposes). PDN 150 may include, and/or be connected to, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks. PDN 150 may include application server 155. Application server 155 may include one or more computer devices that host one or more applications and/or other types of services used by UE device 110. Core network 140 may establish a data flow session between UE device 110 and application server 155 via RAN 130.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
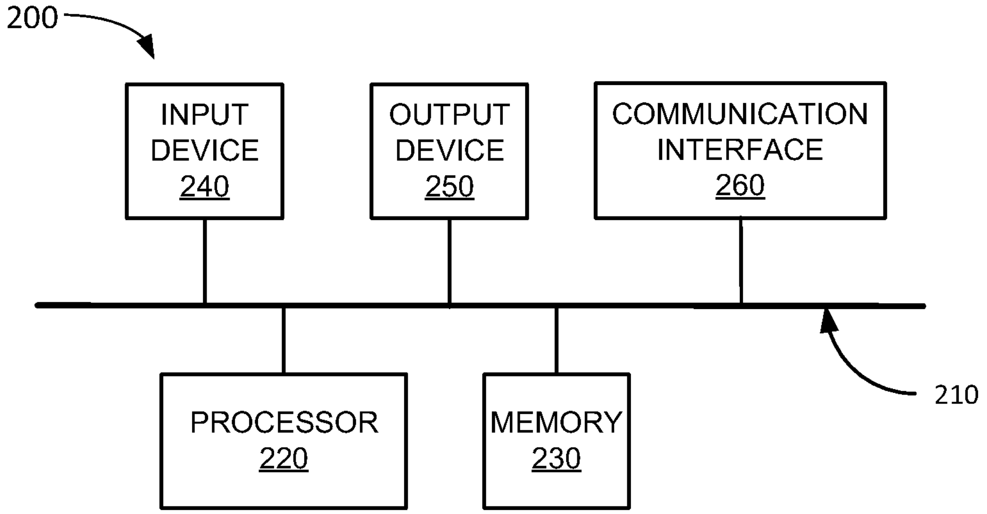
FIG. 2 illustrates exemplary components of a device that may be included in a component of an environment according to an implementation described herein.

FIG. 2 is a diagram illustrating example components of a device 200 according to an implementation described herein. UE device 110, base station 120, and/or application server 155 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to performing conditional handovers between different RAT types. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
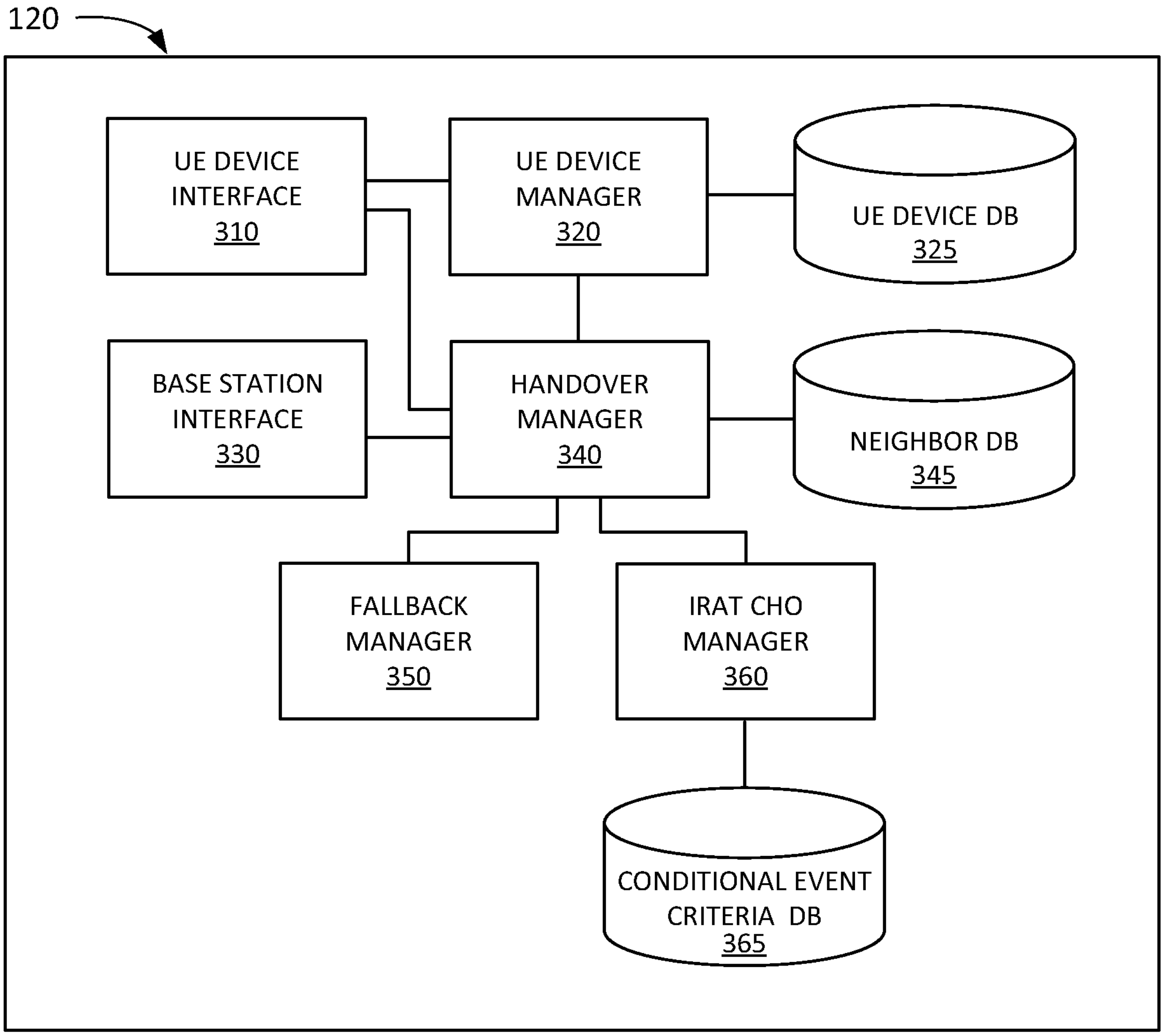
FIG. 3 illustrates exemplary components of a base station according to an implementation described herein.

FIG. 3 is a diagram illustrating exemplary components of base station 120. The components of base station 120 may be implemented, for example, via processor 220 executing instructions from memory 230. For example, one or more components of base station 120 may correspond to the structure of processor 220 together with instructions in memory 230 for implementing the functionality of the component. Alternatively, some or all of the components of base station 120 may be implemented via hard-wired circuitry. For example, one or more components of base station 120 may correspond to the structure of some or all of an ASIC, FPGA, and/or another type of integrated circuit. As shown in FIG. 3, base station 120 may include a UE device interface 310, a UE device manager 320, a UE device database (DB) 325, a base station interface 330, a handover manager 340, a neighbor DB 345, a fallback manager 350, an IRAT CHO manager 360, and a conditional event criteria DB 365.

UE device interface 310 may be configured to communicate with UE device 110. For example, UE device interface 310 may receive a UE capability report from UE device 110 indicating that UE device 110 is enabled for performing inter-RAT conditional handovers. As another example, UE device interface 310 may provide a conditional handover configuration to UE device 110 from handover manager 340.

UE device manager 320 may manage information relating to UE device 110 and store the information in UE device DB 325. UE device DB 325 may store information relating to UE devices 110. For example, UE device DB 325 may store, for a particular UE device 110, information identifying whether the particular UE device 110 is enabled for inter-RAT conditional handovers, a list of potential target base stations 120 for the particular UE device 110, one or more conditional handover event criteria associated with the particular UE device 110, and/or other handover information associated with the particular UE device 110.

Base station interface 330 may be configured to communicate with other base stations 120. For example, base station interface 330 may send conditional handover requests to potential target base stations 120 associated with UE device 110. Handover manager 340 may manage handovers for UE devices 110 attached and/or registered with base station 120. Handover manager 340 may perform handovers to base stations 120 associated with a same RAT type and/or handovers to base stations 120 associated with a different RAT type. Handover manager 340 may use information stored in neighbor DB 345 when performing a handover. Neighbor DB 345 may maintain information relating to neighboring base stations 120. For example, neighbor DB 345 may store, for each neighboring base station 120, a RAT type associated with the neighboring base station 120, bands and/or channels used by the neighboring base station 120, a location associated with the neighboring base station 120, a load associated with the neighboring base station 120, and/or other types of information associated with the neighboring base station 120.

Handover manager 340 may select to prepare a conditional handover for UE device 110 based on, for example, a measurement report received from UE device 110 indicating that a signal and/or quality parameter measured by UE device 110 has decreased below a threshold value. In response, handover manager 340 may select a set of potential target base stations 120 for UE device 110 and one or more conditional event criteria for performing a handover, and may send a conditional event instruction to UE device 110 with information identifying the selected set of potential target base stations 120 and the one or more conditional event criteria for performing the handover. For example, handover manager 340 may send an RRC Reconfiguration message to UE device 110 with the handover information.

Handover manager 340 may use fallback manager 350 and/or inter-RAT (IRAT) conditional handover (CHO) manager 360 when performing an inter-RAT conditional handover. Fallback manager 350 may perform a fallback conditional handover from a gNodeB to an eNodeB located in a same base station 120. For example, when the 5G wireless signals experience a degradation in signal quality (e.g., from an increase in multipath fading in the signal path from base station 120 to UE device 110, etc.), handover manager 340 may select to prepare a conditional handover for UE device 110 that includes a conditional event criterion associated with the eNodeB in base station 120. If UE device 110 detects that the conditional event criterion is satisfied and reports the satisfied criterion in a measurement report to base station 120, fallback manager 350 may perform a fallback handover from the gNodeB to the eNodeB.

I-RAT CHO manager 360 may perform an I-RAT conditional handover to another base station 120 associated with a different RAT type (e.g., from a gNodeB to an eNodeB in another base station 120, from an eNodeB to a gNodeB in another base station 120, etc.). For example, I-RAT CHO manager 360 may generate one or more conditional event criteria for an I-RAT CHO handover for UE device 110 based on information stored in conditional event criteria DB 365. Conditional event criteria DB 365 may store information relating to conditional event criteria that may be provided to UE device 110 in a conditional handover instruction. Exemplary information that may be stored in conditional event criteria DB 365 is described below with reference to FIG. 5.

Although FIG. 3 shows exemplary components of base station 120, in other implementations, base station 120 may include fewer components, different components, additional components, or differently arranged components than depicted in FIG. 3. Additionally, or alternatively, one or more components of base station 120 may perform one or more tasks described as being performed by one or more other components of base station 120.

Figure 4:
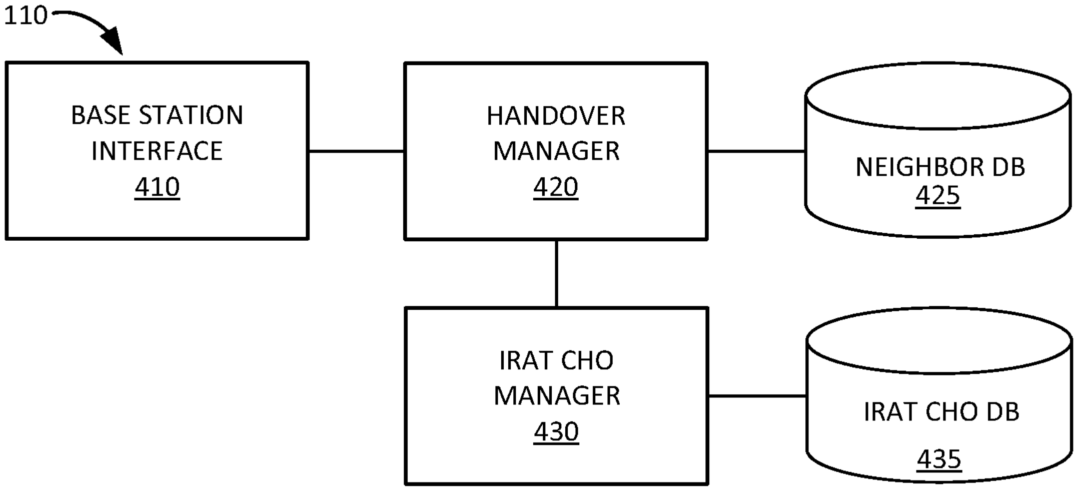
FIG. 4 illustrates exemplary components of a user equipment device according to an implementation described herein.

FIG. 4 is a diagram illustrating exemplary components of UE device 110. The components of UE device 110 may be implemented, for example, via processor 220 executing instructions from memory 230. For example, one or more components of UE device 110 may correspond to the structure of processor 220 together with instructions in memory 230 for implementing the functionality of the component. Alternatively, some or all of the components of UE device 110 may be implemented via hard-wired circuitry. For example, one or more components of UE device 110 may correspond to the structure of some or all of an ASIC, FPGA, and/or another type of integrated circuit. As shown in FIG. 4, UE device 110 may include a base station interface 410, a handover manager 420, a neighbor DB 425, an IRAT CHO manager 430, and an IRAT CHO DB 435.

Base station interface 410 may be configured to communicate with base station 120. For example, base station interface 410 may send measurement reports from UE device 110 to base station 120. As another example, base station interface 410 may receive an instruction from base station 120 to perform an inter-RAT conditional handover.

Handover manager 420 may manage handovers for UE device 110. For example, handover manager 420 may monitor one or more conditional event criteria for a conditional handover. Each criterion may specify measurements to be performed, with respect to source base station 120 to which UE device 110 is attached and/or registered with and with respect to a set of potential target base stations 120 identified in neighbor DB 425, and a threshold with respect to the measurements to be performed. If the threshold is satisfied, handover manager 420 may perform a handover with respect to a target base station 120 associated with the measurements.

Neighbor DB 425 may store information identifying neighboring base stations 120 corresponding to potential target base stations 120 to which a handover may be performed. For example, for each base station 120 identified in neighbor DB 425, neighbor DB 425 may store an identifier for the neighboring base station 120, a band and/or channel used by the neighboring base station 120, a frequency, time location, and/or sub-carrier used by the neighboring base station 120 to transmit a synchronization signal and/or to transmit a reference signal, cell specific offsets associated with the neighboring base station 120, inter-RAT frequencies associated with the neighboring base station 120 (e.g., an Evolved Universal Mobile Telecommunications Service (UMTS) Terrestrial Radio Access (EUTRA) frequency, etc.), an indication of whether the neighboring base station 120 should be whitelisted or blacklisted, and/or other types of information associated with the neighboring base station 120 that may be used by UE device 110 to perform a conditional handover.

IRAT CHO manager 430 may perform an inter-RAT conditional handover for handover manager 420. For example, IRAT CHO manager 430 may perform measurements associated with conditional event criteria stored in IRAT CHO DB 435. IRAT CHO DB 435 may store one or more conditional event criteria for performing conditional handovers received from the source base station 120 and selected by the source base station from conditional event criteria DB 365. When IRAT CHO manager 430 determines that a conditional event criterion for a measurement is satisfied, IRAT CHO manager 30 may instruct handover manager 420 to send a conditional handover confirmation message to a target base station 120 associated with the measurement. The target base station 120 may complete the handover and send a message to the source base station 120 that the handover is complete.

Although FIG. 4 shows exemplary components of UE device 110, in other implementations, UE device 110 may include fewer components, different components, additional components, or differently arranged components than depicted in FIG. 4. Additionally, or alternatively, one or more components of UE device 110 may perform one or more tasks described as being performed by one or more other components of UE device 110.

Figure 5:
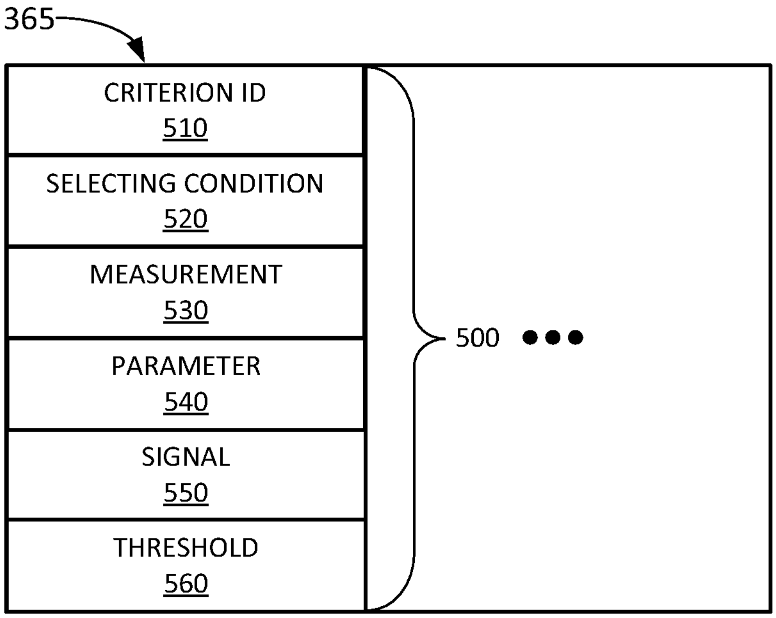
FIG. 5 illustrates exemplary components of a conditional event criteria database according to an implementation described herein.

FIG. 5 illustrates exemplary components of conditional event criteria DB 365. As shown in FIG. 5, conditional event criteria DB 365 may include one or more criterion records 500. Each criterion record 500 may store information relating to a particular conditional event criterion for a conditional event to trigger a conditional handover. Criterion record 500 may include a criterion identifier (ID) field 510, a selecting condition field 520, a measurement field 530, a parameter field 540, a signal field 550, and a threshold field 560.

Criterion ID field 510 may store an ID that uniquely identifies a particular criterion. Selecting condition field 520 may identify one or more conditions for selecting the particular criterion. For example, a selecting condition may include a KPI parameter associated with a potential target base station 120, such as, for example, a load associated with the potential target base station 120, an available capacity (e.g., a throughput capacity, a number of connections capacity, etc.) associated with the potential target base station 120, a number of UE device 110 active sessions associated with the potential target base station 120, a total throughput associated with the potential target base station 120, an average latency associated with the potential target base station 120, and/or another type of KPI associated with the potential target base station 120. Thus, in some implementations, different selecting conditions may be used to select conditional event criteria for a condition handover for a potential target base station 120.

As another example, the selecting condition may include a range of values for a parameter associated with UE device 110. The parameter associated with UE device 110 may include, or example, a speed associated with UE device 110, an elevation associated with UE device 110, a handover time associated with UE device 110, a handover failure rate associated with UE device 110, a latency associated with UE device 110, a packet error rate associated with UE device 110, and/or another type of parameter associated with UE device 110 that may affect handovers.

Measurement field 530 may store information identifying a measurement to be performed. For example, measurement field 530 may identify a frequency, time location, and/or sub-carrier on which to perform a measurement. Parameter field 540 may identify a signal strength and/or quality parameter to measure, such as, for example, RSRP, RSR, RSSI, SINR, CQI, BLER, MIMO rank, and/or another parameter indicative of signal strength and/or quality value. Signal field 550 may identify a signal to measure, such as, for example, a PSS, an SSS, a CSI-RS, and/or another type of signal.

Threshold field 560 may store information identifying a threshold for the parameter. When the threshold is satisfied, the conditional event criterion may be determined to be satisfied. The threshold may include an absolute threshold for the source base station 120, an absolute threshold for the target base station 120, a difference threshold between the source base station 120 and the target base station 120, an offset threshold for the source base station 120 between two consecutive measurements, an offset threshold for the target base station 120 between two consecutive measurements, or any combination thereof.

Although FIG. 5 shows exemplary components of conditional event criteria DB 365, in other implementations, conditional event criteria DB 365 may include fewer components, different components, additional components, or differently arranged components than depicted in FIG. 5.

Figure 6:
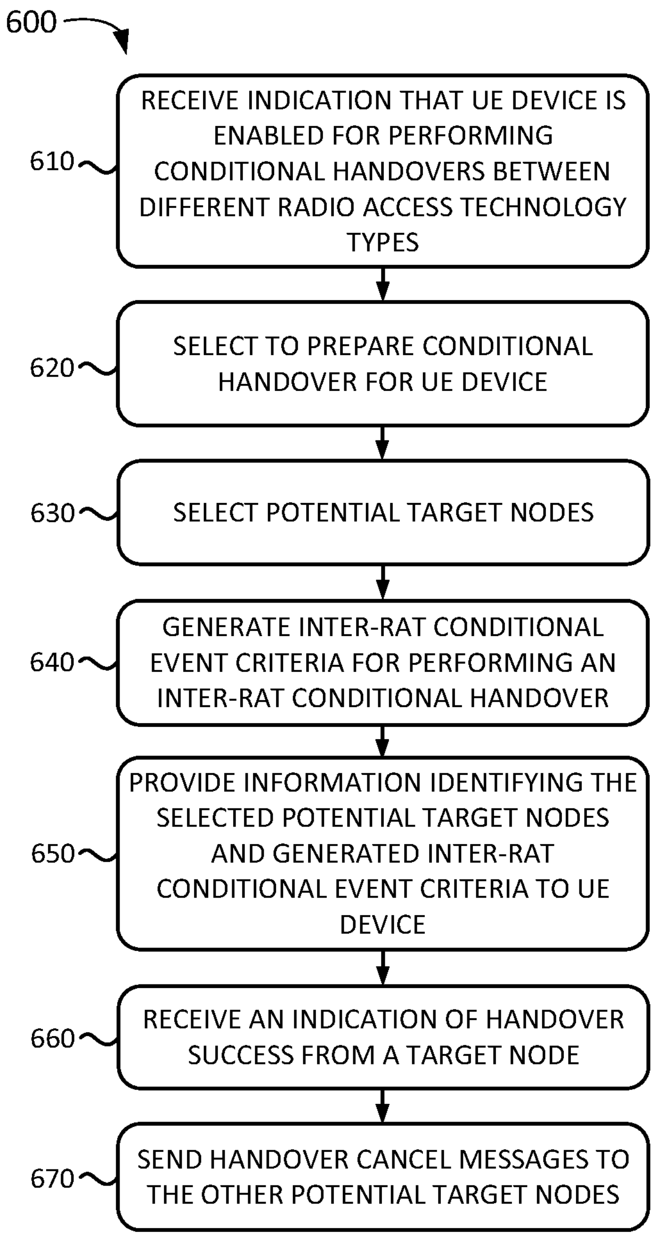
FIG. 6 illustrates a flowchart of a first process for performing a conditional handover according to an implementation described herein.

FIG. 6 illustrates a flowchart of a first process 600 for performing a conditional handover according to an implementation described herein. In some implementations, process 600 of FIG. 6 may be performed by base station 120. In other implementations, some or all of process 600 may be performed by another device or a group of devices separate from base station 120.

As shown in FIG. 6, process 600 may include receiving an indication that a UE device is enabled for performing conditional handovers between different RAT types (block 610). For example, base station 120 may receive a capability report from UE device 110 indicating that UE device 110 has been enabled for inter-RAT conditional handovers. Base station 120 may store information relating to the inter-RAT conditional handover capability for UE device 110 in UE device DB 325. In some implementations, base station 120 may instruct UE device 110 to enable inter-RAT conditional handovers.

Process 600 may further include selecting to prepare a conditional handover for the UE device (block 620). For example, base station 120 may receive a measurement report from UE device 110 that includes a measured signal strength and/or quality value, for signals received by UE device 110 from base station 120, that satisfies a conditional handover threshold. In response, base station 120 may select to prepare a conditional handover for UE device 110.

Process 600 may further include selecting potential target nodes (block 630), generating one or more inter-RAT conditional event criteria for performing an inter-RAT conditional handover (block 640), and providing information identifying the selected potential target nodes and the generated inter-RAT conditional event criteria to the UE device (block 650). For example, base station 120 may select a set of potential target base stations 120 from a neighbor list based on one or more target node selection criteria, such as, for example, the location of UE device 110 and the location of each neighboring base station 120, loads associated with particular neighboring base stations 120, and/or other types of target node selection criteria.

Furthermore, base station 120 may select one or more conditional event criteria from conditional event criteria DB 365 based on information associated with the selected potential target base stations 120 and/or information associated with UE device 110. For example, base station 120 may determine parameters associated with source base station 120, potential target base stations 120, and/or UE device 110 and use the determined parameters to identify selecting conditions in selecting condition field 620 of criterion records 500 in conditional event criteria DB 365. If no selecting conditions are identified, base station 120 may select one or more default conditional event criteria from conditional event criteria DB 365. Base station 120 may generate an RRC Reconfiguration message that includes an instruction to carry out a conditional handover with respect to the selected potential target base stations 120 if a conditional event criterion from the selected conditional event criteria is satisfied. Base station 120 may send the generated RRC Reconfiguration message to UE device 110.

Process 600 may further include receiving an indication of handover success from a target node (block 660) and sending handover cancel messages to the other potential target nodes (block 670). For example, UE device 110 may detect a conditional event criterion with respect to a target base station 120, send a conditional handover confirmation to the target base station 120, and target base station 120 may complete the handover. The target base station 120 may then send a "handover success" message to the source base station 120 and the source base station 120 may send a "handover cancel" message to all the other selected potential target base station 120.

Figure 7:
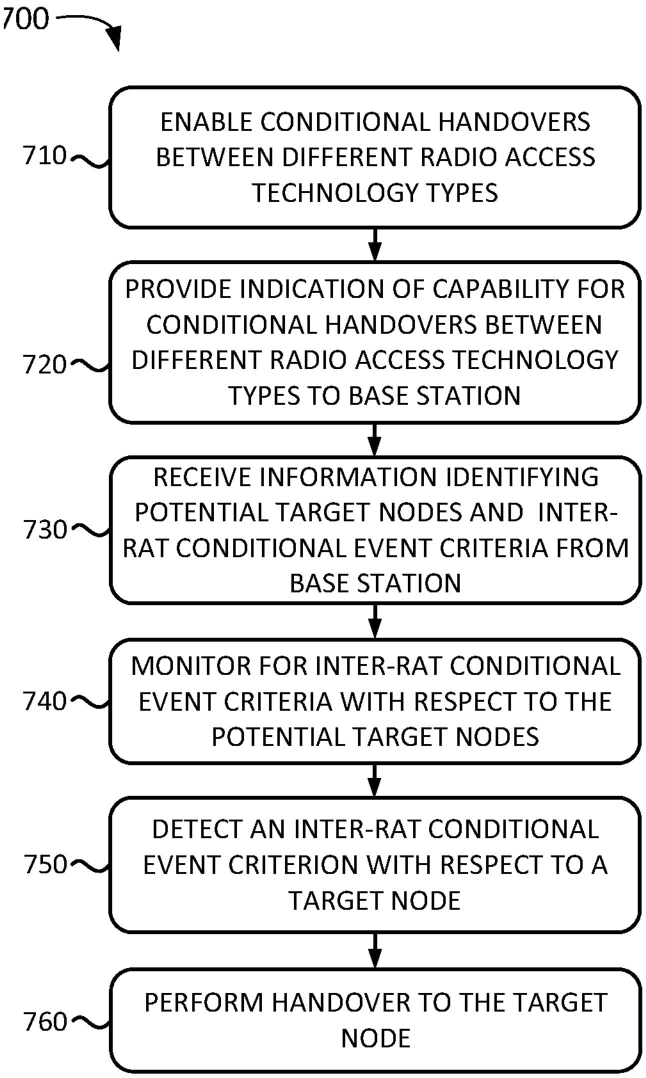
FIG. 7 illustrates a flowchart of a second process for performing a conditional handover according to an implementation described herein.

FIG. 7 illustrates a flowchart of a second process 700 for performing a conditional handover according to an implementation described herein. In some implementations, process 700 of FIG. 7 may be performed by UE device 110. In other implementations, some or all of process 700 may be performed by another device or a group of devices separate from UE device 110.

As shown in FIG. 7, process 700 may include enabling conditional handovers between different RAT types (block 710) and providing indication of the capability for conditional handovers between different RAT types to a base station (block 720). For example, UE device 110 may be configured to enable inter-RAT conditional handovers and may send a UE capability report to base station 120 indicating the inter-RAT conditional handover capability.

Process 700 may further include receiving information identifying potential target nodes and inter-RAT conditional event criteria from the base station (block 730). For example, UE device 110 may receive an RRC Reconfiguration message from base station 120 that identifies a set of potential target base stations 120 for a conditional handover and includes one or more conditional event criteria for initiating a conditional handover.

Process 700 may further include monitoring for the inter-RAT conditional event criteria with respect to the potential target nodes (block 740), detecting an inter-RAT conditional event criterion with respect to a target node (block 750), and performing a handover to the target node (block 760). For example, UE device 110 may monitor particular frequencies, time slots, and/or sub-carriers for particular signals from base stations 120 and measure a signal strength and/or quality parameter value and compare the measured parameter value to a threshold value specified in a conditional event criterion. If a threshold is satisfied for a measured signal strength and/or quality parameter value associated with a potential target base station 120, UE device 110 may select the potential target base station 120 as the target base station 120 for the conditional handover and send a conditional handover confirmation message to the selected target base station 120. The selected target base station 120 may then complete the handover and send a "handover complete" message to the target base station 120.

Figure 8:
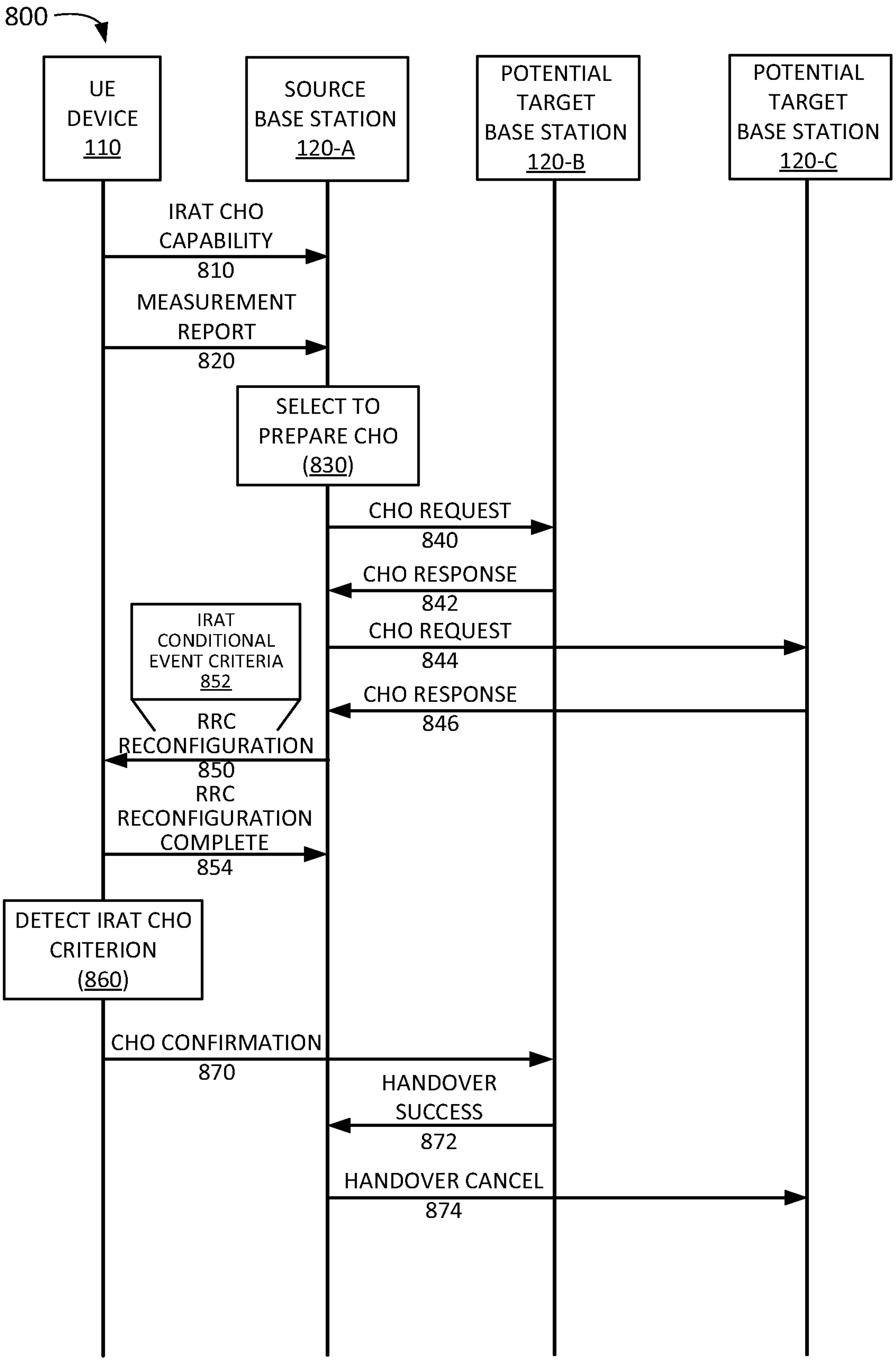
FIG. 8 illustrates an exemplary signal flow diagram according to an implementation described herein.

FIG. 8 illustrates an exemplary signal flow 800 according to an implementation described herein. As shown in FIG. 8, signal flow 800 includes UE device 110 sending an indication of inter-RAT conditional handover capability in a UE device capability message to source base station 120-A (signal 810). Source base station 120-A may store information identifying the inter-RAT conditional handover capability for UE device 110 in UE device DB 325. At a later time, UE device 110 may send a measurement report to source base station 120-A (signal 820). The measurement report may include a measured signal strength and/or quality value, for signals received by UE device 110 from source base station 120-A, that satisfies a conditional handover threshold.

In response to receiving the measurement report, source base station 120-A may select to prepare a conditional handover for UE device 110 (signal 830). Source base station 120-A may select potential target base stations 120-B and 120-C and send a conditional handover request to potential target base stations 120-B and 120-C (signals 840 and 844). Potential target base stations 120-B and 120-C may each send a conditional handover response back to source base station 120-A acknowledging that the conditional handover request has been received (signals 842 and 846). Potential target base stations 120-B and 120-C may prepare for a potential handover for UE device 110 (e.g., by initiating early data forwarding, etc.).

Furthermore, source base station 120-A may send an RRC Reconfiguration message to UE device 110 (block 850). The RRC Reconfiguration message may include inter-RAT conditional event and/or triggering conditions/criteria selected by source base station 120-A for the conditional handover (item 852). UE device 110 may respond with a RRC Reconfiguration complete message (signal 854). UE device 110 may monitor for the conditional event criteria and detect that an inter-RAT conditional event criterion has been satisfied (block 860). For example, UE device 110 may measure a signal strength and/or quality parameter on a signal on a particular frequency associated with potential target base station 120-B and determine that the measured signal strength and/or quality parameter satisfies a threshold for the conditional event criterion. In response, UE device 110 may send a conditional event confirmation to potential target base station 120-B (signal 870). In response, potential target base station 120-B may send a "handover complete" message to source base station 120-A (signal 872). In response, source base station 120-A may release resources associated with maintaining a connection for UE device 110 and send a "handover cancel" message to potential target base station 120-C (signal 874).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signals have been described with respect to FIG. 8, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by a device, an indication that a user equipment (UE) device is enabled for performing conditional handovers between different Radio Access Technology (RAT) types;

selecting, by the device, to prepare a conditional handover for the UE device;

selecting, by the device, a plurality of potential target nodes for the conditional handover for the UE device, wherein the plurality of potential target nodes includes, based on the received indication, at least one potential target node of a different RAT type than a RAT type currently being used by the UE device to communicate with a base station;

generating, by the device, one or more inter-RAT conditional event criteria for performing an inter-RAT conditional handover by the UE device based on the received indication, wherein generating the one or more inter-RAT conditional event criteria for performing the inter-RAT conditional handover by the UE device includes:

selecting a range of values for a parameter associated with the UE device; and associating a threshold value for a signal strength or quality parameter for a synchronization signal or a reference signal as a condition for activating the inter-RAT conditional handover with the selected range of values for the parameter associated with the UE device; and providing, by the device, conditional handover information to the UE device, wherein the conditional handover information includes information identifying the selected plurality of potential target nodes and information identifying the generated one or more inter-RAT conditional event criteria.

2. The method of claim 1, wherein receiving the indication that the UE device is enabled for performing conditional handovers between different RAT types includes:

receiving a UE capability information message from the UE device.

3. The method of claim 1, further comprising:

instructing the UE device to enable conditional handovers between different RAT types.

4. The method of claim 1, wherein selecting to prepare the conditional handover for the UE device includes:

sending conditional handover requests to the plurality of potential target nodes.

5. The method of claim 1, wherein providing the conditional handover information to the UE device includes:

sending a Radio Resource Control Reconfiguration message to the UE device.

6. The method of claim 1, wherein generating the one or more inter-RAT conditional event criteria for performing the conditional handover by the UE device includes:

selecting a signal strength or quality parameter;

selecting a signal to measure; and selecting the threshold value for the selected signal strength or quality parameter for the selected signal as a condition for triggering the inter-RAT conditional handover.

7. The method of claim 6, wherein the selected signal strength or quality parameter includes:

a Reference Signal Received Power (RSRP), a Reference Signal Received Quality (RSRQ), a Received Signal Strength Indicator (RSSI), or a Signal to Interference and Noise Ratio (SINR).

8. The method of claim 6, wherein the selected signal strength or quality parameter includes a Multiple-Input and Multiple-Output (MIMO) rank indicator.

9. The method of claim 6, wherein the selected signal includes a Synchronization Signal or a Channel State Information (CSI) Reference Signal.

10. The method of claim 1, wherein generating the one or more inter-RAT conditional event criteria for performing the conditional handover by the UE device includes:

determining a value for a key performance indicator (KPI) parameter associated with the at least one potential target node of the different RAT type; and selecting the threshold value for the signal strength or quality parameter for the synchronization signal or the reference signal as the condition for activating the inter-RAT conditional handover based on the determined value for the KPI parameter.

11. The method of claim 1, wherein the parameter associated with the UE device includes:

a speed associated with the UE device;

an elevation associated with the UE device;

a handover time associated with the UE device;

a handover failure rate associated with the UE device;

a latency associated with the UE device; or a packet error rate associated with the UE device.

12. A device comprising:

a processor configured to:

receive an indication that a user equipment (UE) device is enabled for performing conditional handovers between different Radio Access Technology (RAT) types;

select to prepare a conditional handover for the UE device;

select a plurality of potential target nodes for the conditional handover for the UE device, wherein the plurality of potential target nodes includes, based on the received indication, at least one potential target node of a different RAT type than a RAT type currently being used by the UE device to communicate with a base station;

generate one or more inter-RAT conditional event criteria for performing an inter-RAT conditional handover by the UE device based on the received indication, wherein the processor configured to generate the one or more inter-RAT conditional event criteria for performing the inter-RAT conditional handover is further configured to:

select a range of values for a parameter associated with the UE device; and associate a threshold value for a signal strength or quality parameter for a synchronization signal or a reference signal as a condition for activating the inter-RAT conditional handover with the selected range of values for the parameter associated with the UE device; and provide conditional handover information to the UE device, wherein the conditional handover information includes information identifying the selected plurality of potential target nodes and information identifying the generated one or more inter-RAT conditional event criteria.

13. The device of claim 12, wherein the processor is further configured to:

instruct the UE device to enable conditional handovers between different RAT types.

14. The device of claim 12, wherein, when generating the one or more inter-RAT conditional event criteria for performing the conditional handover by the UE device, the processor is further configured to:

select a signal strength or quality parameter;

select a signal to measure; and select the threshold value for the selected signal strength or quality parameter for the selected signal as a condition for activating the inter-RAT conditional handover.

15. The device of claim 14, wherein the selected signal strength or quality parameter includes:

a Reference Signal Received Power (RSRP), a Reference Signal Received Quality (RSRQ), a Received Signal Strength Indicator (RSSI), a Signal to Interference and Noise Ratio (SINR), or a Multiple-Input and Multiple-Output (MIMO) rank indicator.

16. The device of claim 12, wherein, when generating the one or more inter-RAT conditional event criteria for performing the conditional handover by the UE device, the processor is further configured to:

determine a value for a key performance indicator (KPI) parameter associated with the at least one potential target node of the different RAT type; and select the threshold value for the signal strength or quality parameter for the synchronization signal or the reference signal as the condition for activating the inter-RAT conditional handover based on the determined value for the KPI parameter.

17. The device of claim 12, wherein the parameter associated with the UE device includes:

a speed associated with the UE device;

an elevation associated with the UE device;

a handover time associated with the UE device;

a handover failure rate associated with the UE device;

a latency associated with the UE device; or a packet error rate associated with the UE device.

18. A non-transitory computer-readable memory device storing instructions executable by a processor, the non-transitory computer-readable memory device comprising:

one or more instructions to receive an indication that a user equipment (UE) device is enabled for performing conditional handovers between different Radio Access Technology (RAT) types;

one or more instructions to select to prepare a conditional handover for the UE device;

one or more instructions to select a plurality of potential target nodes for the conditional handover for the UE device, wherein the plurality of potential target nodes includes, based on the received indication, at least one potential target node of a different RAT type than a RAT type currently being used by the UE device to communicate with a base station;

one or more instructions to generate one or more inter-RAT conditional event criteria for performing an inter-RAT conditional handover by the UE device based on the received indication, wherein the one or more instructions to generate the one or more inter-RAT conditional event criteria for performing the inter-RAT conditional handover include:

one or more instructions to select a range of values for a parameter associated with the UE device; and one or more instructions to associate a threshold value for a signal strength or quality parameter for a synchronization signal or a reference signal as a condition for activating the inter-RAT conditional handover with the selected range of values for the parameter associated with the UE device; and one or more instructions to provide conditional handover information to the UE device, wherein the conditional handover information includes information identifying the selected plurality of potential target nodes and information identifying the generated one or more inter-RAT conditional event criteria.

19. The non-transitory computer-readable memory device of claim 18, the non-transitory computer-readable memory device further comprising:

one or more instructions to instruct the UE device to enable conditional handovers between different RAT types.

20. The non-transitory computer-readable memory device of claim 18, wherein the parameter associated with the UE device includes:

a speed associated with the UE device;

an elevation associated with the UE device;

a handover time associated with the UE device;

a handover failure rate associated with the UE device;

a latency associated with the UE device; or a packet error rate associated with the UE device.

* * * * *